F. H. RELPH.
Cattle-Supports.

No. 161,825.

Patented April 6, 1875.

Witnesses:
J. H. Shumway
Jos. C. Earle

Francis Nevin Relph
Inventor
By Atty. John P. Earle

UNITED STATES PATENT OFFICE.

FRANCIS HERON RELPH, OF LONDON, ENGLAND.

IMPROVEMENT IN CATTLE-SUPPORTS.

Specification forming part of Letters Patent No. 161,825, dated April 6, 1875; application filed February 5, 1875.

*To all whom it may concern:*

Be it known that I, FRANCIS HERON RELPH, of London, in the Kingdom of England, have invented new and useful improved fittings for carrying cattle, horses, or other animals in vessels at sea or on land, of which the following is a specification:

This invention consists in portable stalls, constructed so as to be capable of being stowed away, so that the ship is available for cargo when not carrying cattle, horses, or other animals.

The invention consists in upright posts or stanchions fitting into shoes in the upper and lower decks, with side bars so constructed that both ends slide up in grooves in the upright posts, combined with a sling or strong band made of netting, rope, canvas, or other material upon said side bars, and a windlass, whereby the canvas can be raised or lowered at any time under the animal's body.

The slings may consist of one continuous band of netting, rope, canvas, or other material, running under the animals' bodies and over the side bars, said bars connecting with a windlass over the block of stalls by means of ropes or chains attached to the side bars, so that they can be raised or lowered; or the slings may be fixed to the bars, and the other end connected by ropes or chains.

By these means the animals, instead of being suspended during the whole passage, (which sometimes takes many weeks,) to the great detriment of their health and comfort, may be only supported during heavy weather, and in ordinary weather stand in their stalls in their usual manner, the stalls being so contrived that they have support on all sides, and still have no pressure upon them.

Another advantage is, that should it be necessary to remove any of the animals, any stall can be opened without interfering with the other animals.

The usual water-troughs and feeding-rack are attached to each stall, and water supplied by pipes.

Figure 1:
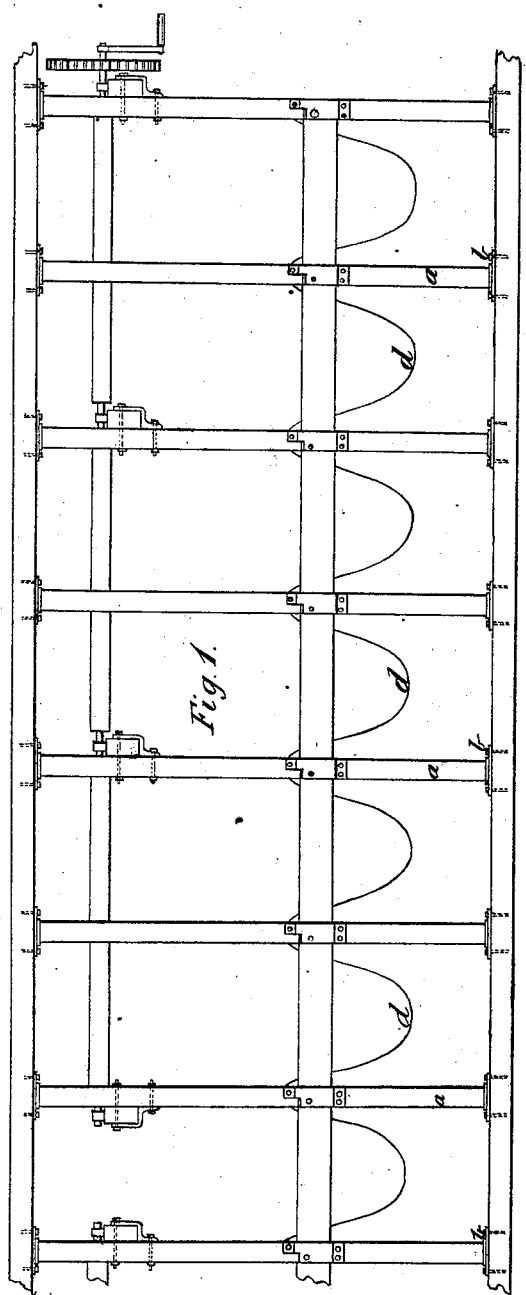
Figure 2:
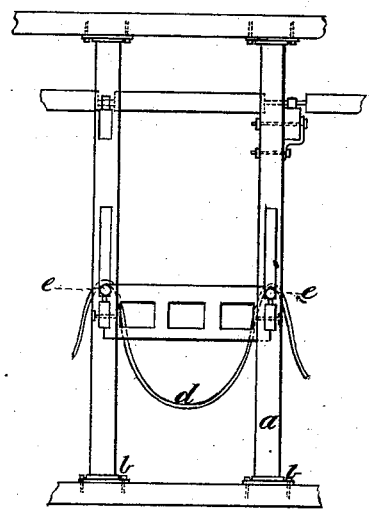

In the accompanying drawings, Figure 1 is a front view of a series of stalls fitted up as described; Fig. 2, an end view, and Fig. 3 a side view, of one of the stalls.

Figure 3:
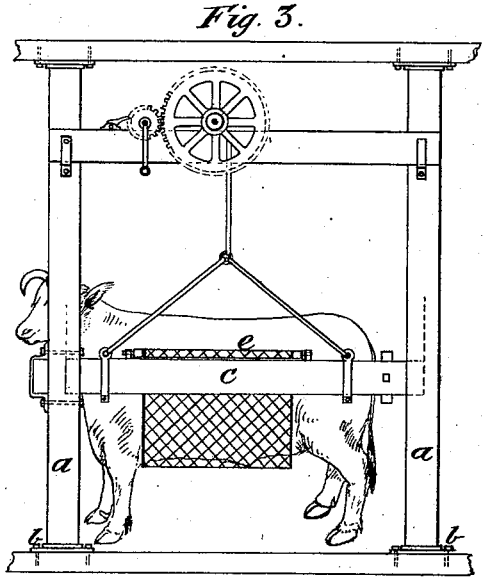

$a$ are the upright stanchions, fitting into shoes $b$. $c$ are side bars made to slide in uprights $a$. $d$ represents the sling for supporting the animals, which sling is passed over the rollers $e$ or side bars $c$. The raising or lowering of the side bars and slings is effected by a suitable windlass above, as shown in Figs. 1 and 3.

I do not broadly claim a device for supporting stock in transportation, as such, I am aware, is not new, as may be seen by the patent of Bogeli, June 13, 1865, and Payne & Cleghorn, November 9, 1869. Neither do I claim any of the elements, except as in the combination hereinafter specified.

I claim—

The upright stanchions $a$, shoes $b$, side bars $c$, and rollers $e$, supporting the sling $d$, with a windlass above connected to said side bars, all combined, arranged, and operating substantially as herein set forth and shown.

In testimony whereof I have hereunto set my hand this 23d day of October, 1874.

F. H. RELPH.

Witnesses:
  E. T. HUGHE,
      120 *Chancery Lane, London.*
  W. A. BARLOW,
      120 *Chancery Lane, London.*